United States Patent
Maguin

(10) Patent No.: US 12,338,758 B2
(45) Date of Patent: Jun. 24, 2025

(54) METHOD FOR HEATING A HOUSING CONTAINING AT LEAST ONE FUNCTIONAL BODY

(71) Applicant: VITESCO TECHNOLOGIES GMBH, Regensburg (DE)

(72) Inventor: Georges Maguin, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 17/798,431

(22) PCT Filed: Mar. 3, 2021

(86) PCT No.: PCT/EP2021/055303
§ 371 (c)(1),
(2) Date: Aug. 9, 2022

(87) PCT Pub. No.: WO2021/180533
PCT Pub. Date: Sep. 16, 2021

(65) Prior Publication Data
US 2023/0070471 A1    Mar. 9, 2023

(30) Foreign Application Priority Data
Mar. 9, 2020    (FR) ...................... 2002297

(51) Int. Cl.
*F01N 3/20* (2006.01)
*B60K 13/04* (2006.01)
(Continued)

(52) U.S. Cl.
CPC .............. *F01N 3/208* (2013.01); *B60K 13/04* (2013.01); *B60K 15/03* (2013.01); *F01P 11/029* (2013.01);
(Continued)

(58) Field of Classification Search
CPC .. F01N 3/208; F01N 2610/02; F01N 2610/10; F01N 2610/1406; F01N 2570/22;
(Continued)

(56) References Cited

U.S. PATENT DOCUMENTS 8,910,620 B2 * 12/2014 Kraus ................... B60K 13/04
                                                       123/670
9,121,318 B2    9/2015 Maguin et al.
(Continued)

FOREIGN PATENT DOCUMENTS

CN          106687669 A        5/2017
DE      10 2011 118 652        5/2013
(Continued)

OTHER PUBLICATIONS

International Search Report for PCT/EP2021/055303, dated Mar. 31, 2021, with English translation (6 pages).
(Continued)

*Primary Examiner* — Phutthiwat Wongwian
*Assistant Examiner* — Diem T Tran
(74) *Attorney, Agent, or Firm* — NIXON & VANDERHYE

(57) ABSTRACT

Disclosed is a method for heating a housing containing at least one functional member, the housing including: at least one wall shared with a reservoir intended to receive a liquid; and at least one wall provided with an orifice leading to the outside and closed by a pressure equalizing membrane porous to water vapor and impermeable to liquid water. The method is notable in that the interior volume of the housing is heated in at least one of the following situations: when the reservoir is subjected to a drop in temperature other than a drop in temperature likely to cause the liquid to freeze; each time a vehicle equipped with this housing is started; and when thermal conditions capable of producing condensates (Continued)

are detected in the interior volume of the housing, closed by the membrane.

19 Claims, 1 Drawing Sheet

(51) Int. Cl.
  *B60K 15/03* (2006.01)
  *F01P 11/02* (2006.01)
  *F01P 11/20* (2006.01)
(52) U.S. Cl.
  CPC ..... *F01P 11/20* (2013.01); *B60K 2015/03427* (2013.01); *F01N 2570/22* (2013.01); *F01N 2610/02* (2013.01); *F01N 2610/10* (2013.01); *F01N 2610/1406* (2013.01); *F01P 2037/02* (2013.01); *F01P 2070/04* (2013.01)
(58) Field of Classification Search
  CPC . F01N 3/2066; F01P 2037/02; F01P 2070/04; F01P 11/029; F01P 11/20; B60K 13/04; B60K 15/03; B60K 2015/03427; Y02A 50/20; Y02A 10/12
  See application file for complete search history.

(56) References Cited

U.S. PATENT DOCUMENTS

| | | | |
|---|---|---|---|
| 10,301,994 | B2 | 5/2019 | Brëck |
| 11,181,025 | B2 | 11/2021 | Mulazzani |
| 2014/0117015 | A1 | 5/2014 | Kraus |
| 2017/0248057 | A1 | 8/2017 | Imanishi |

FOREIGN PATENT DOCUMENTS

| | | | | | |
|---|---|---|---|---|---|
| DE | 10 2014 112 227 | | 3/2016 | | |
| EP | 2829699 | * | 1/2015 | | |
| FR | 3069196 A1 | * | 1/2019 | ........... | B60K 15/035 |
| JP | 2012180757 A | | 9/2012 | | |
| WO | 0134950 A1 | | 5/2001 | | |
| WO | 2015158948 A1 | | 10/2015 | | |
| WO | WO-2016021537 A1 | * | 2/2016 | ........... | F01N 3/2066 |
| WO | 2016054666 A1 | | 4/2016 | | |
| WO | 2019/110629 | | 6/2019 | | |

OTHER PUBLICATIONS

Written Opinion of the ISA for PCT/EP2021/055303, dated Mar. 31, 2021 (6 pages).
Hienonen, R. et al., "Corrosion and climatic effects in electronics" 2007. VPP Publications. vol. 626 (420 pages).
Office Action, issued in Chinese Patent Application No. 202180019893.2 dated Oct. 26, 2023.

* cited by examiner

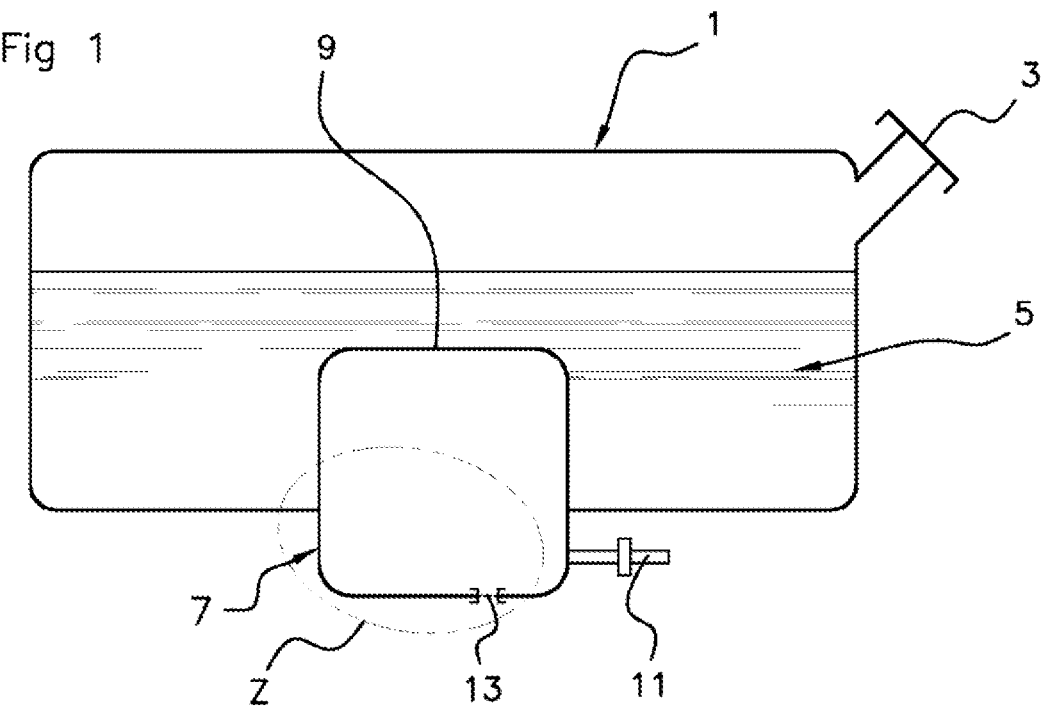
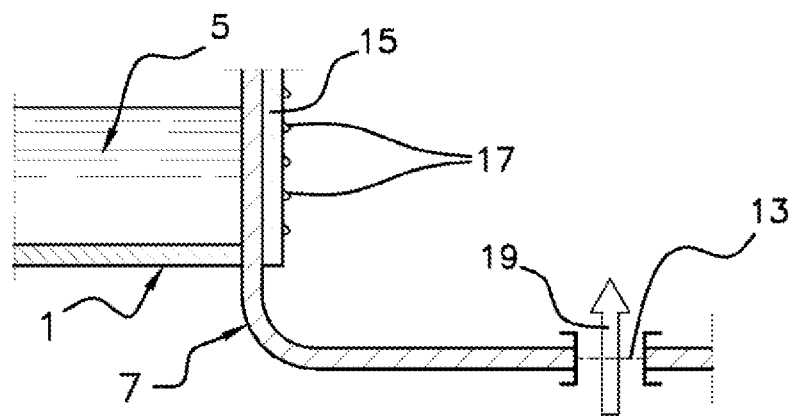
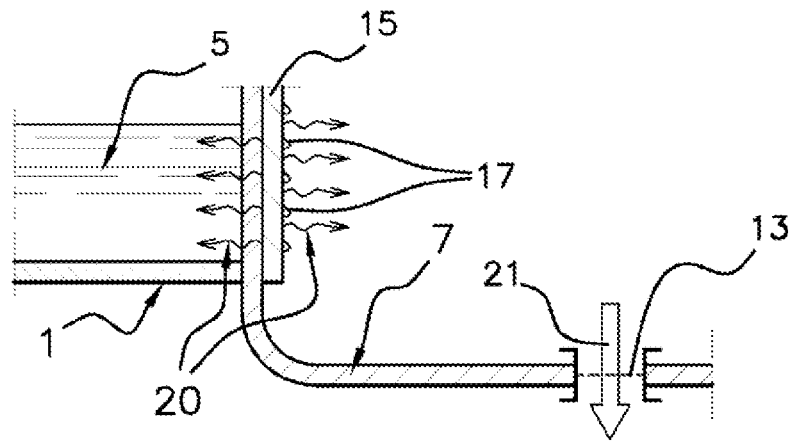

METHOD FOR HEATING A HOUSING CONTAINING AT LEAST ONE FUNCTIONAL BODY

CROSS-REFERENCE TO RELATED PRIORITY APPLICATIONS

This application is the U.S. national phase of International Application No. PCT/EP2021/055303 filed Mar. 3, 2021 which designated the U.S. and claims priority to FR 2002297 filed Mar. 9, 2020, the entire contents of each of which are hereby incorporated by reference.

BACKGROUND OF THE INVENTION

Field of the Invention

The present patent application relates to a method for heating a housing containing at least one functional member, this method having applications in particular in the field of automotive equipment.

Description of the Related Art

The prior art discloses a method for heating a housing containing at least one functional member, said housing comprising:
- at least one wall shared with a reservoir intended to receive a liquid, and
- at least one wall provided with an orifice leading to the outside and closed by a membrane porous to water vapor.

Such a method is used in particular in the field of automotive equipment, for example to heat a reservoir of urea intended to reduce NOx emissions in the exhaust gases of a diesel engine, in order to prevent this urea from freezing when the temperature outside the vehicle drops below the freezing point of the liquid—specifically −11.5° C. in the case of a urea solution having a concentration of 32.5%: the housing containing at least one functional member has a wall shared with the reservoir intended to receive the urea, and the functional member may comprise a pressure sensor, a temperature sensor, a level sensor, a pump, an electrically controlled valve, etc., all of these members making it possible to measure the situation inside the reservoir, and to extract the urea therefrom toward the point of use depending on commands received from the electronic controller of the vehicle.

Such a method can also be used to heat a reservoir of water for cooling a gasoline engine, in order to save fuel or to meet standards requiring that fuel not be used for the simple purpose of cooling the engine.

A constant problem found with such a housing having a wall shared with the reservoir intended to receive the liquid is the formation of condensation on this wall, in certain situations in which this wall is suddenly cooled.

These particular situations include in particular filling the reservoir with a relatively cold liquid such as urea or water, or even sudden cooling when the vehicle is in motion, resulting in the housing being brought into sudden contact with external water which can for example come from fording.

The formation of condensation on the wall of the housing is detrimental, because after accumulation it can lead to a corrosion phenomenon and premature damage to the functional members located inside this housing, as much by possible corrosion of the metal elements constituting these members as by deterioration of the insulation resistances of the electrical circuits and components.

SUMMARY OF THE INVENTION

The object of the present invention is in particular to overcome these drawbacks.

This objective, and also others which will become apparent on reading the following description, is achieved with a method for heating a housing containing at least one functional member, said housing comprising:
- at least one wall shared with a reservoir intended to receive a liquid, and
- at least one wall provided with an orifice leading to the outside and closed by a pressure equalizing membrane porous to water vapor and impermeable to liquid water,
- this method being notable in that the interior volume of said housing is heated in at least one of the following situations:
- when said reservoir is subjected to a drop in temperature other than a drop likely to cause said liquid to freeze,
- each time a vehicle equipped with this housing is started,
- when thermal conditions capable of producing condensates are detected in the interior volume of said housing, closed by said membrane.

According to other, optional features of the method according to the invention, taken individually or in combination:
- the interior volume of said housing is heated when said reservoir is filled with said liquid, or after having detected this filling: filling the reservoir, for example with cold urea, cools the wall common to the housing and the reservoir, thus causing condensation on the inside of the housing, therefore on the surface of the shared wall inside the housing; this filling can easily be detected for example with a level or temperature probe present in the housing;
- the interior volume of said housing is heated when said reservoir and said housing are at least partially submerged during fording: such a fording can have the effect of suddenly cooling the housing and the reservoir, thus causing condensation; this sudden cooling can be detected for example with a temperature probe present in the housing;
- the interior volume of said housing is heated by means of elements secured to said shared wall and provided to ensure that said liquid melts (antifreeze): heating elements which already exist for other functions are thus used, thereby avoiding having to add specific heating elements;
- the interior volume of said housing is heated by means of a heat flow coming from the engine of a vehicle equipped with said reservoir: this alternative heating means also makes it possible to use a pre-existing hot source, and which therefore does not require the installation of specific heating elements;
- the heating of the interior volume of said housing is triggered on the basis of information supplied by a sensor selected from the group comprising a sensor for sensing the pressure, a sensor for sensing the temperature, a sensor for sensing the level inside said reservoir, an opening sensor for sensing the opening of the filling orifice of said reservoir: these sensors already exist in the system of the vehicle, so as to be able to supply information regarding the liquid which fills the reservoir; therefore, pre-existing sensors are used, such that it is not necessary to install specific sensors to implement the method according to the invention;

the interior volume of said housing is heated for at least 30 seconds and at most 2 hours, and so as to raise its absolute temperature from 10K to 100K, and preferably from 20K to 80K: a temperature increase of 60K of the air inside the housing makes it possible to remove 20% of the water vapor, and a temperature increase of 80K makes it possible to remove 30% of the water vapor;

this method is applied to a housing integral with a reservoir of urea for reducing NOx emissions in a diesel engine: this method is particularly suitable for this application, making it possible to reduce the pollution generated by the exhaust gases of a diesel engine;

this method is applied to a housing integral with a reservoir of water for cooling a gasoline engine by water injection: such a water reservoir makes it possible, for new-generation gasoline engines, to comply with the new standards requiring the use of water and prohibiting the deliberate evaporation of fuel to cool the engine;

this method is applied to a housing integral with a reservoir of fuel for supplying the hydrogen production device of a fuel-cell-powered engine: such a device is known as a "generator"—or "reformer".

The present invention also relates to a device for controlling the heating of the interior volume of said housing, programmed to implement the heating method in accordance with the above text: this control device may comprise the electronic controller of the motor vehicle, programmed so as to activate the heating elements on the basis of information forwarded by the various sensors located inside the housing.

BRIEF DESCRIPTION OF THE DRAWINGS

Other features and advantages of the invention will become apparent on reading the following description, with reference to the appended figures, in which:

FIG. 1: shows a schematic section of a reservoir of liquid and its associated housing, to which the method according to the invention is applied;

FIG. 2: shows a detail view of the zone Z in FIG. 1, when the reservoir is being filled with a liquid, causing condensation to form on the inside of the wall of the housing;

FIG. 3: shows a detail view of the zone Z in FIG. 1, once the heating elements arranged on the inside of the wall of the housing have been activated.

For greater clarity, identical or similar elements are denoted by identical or similar reference signs throughout the figures.

DESCRIPTION OF THE PREFERRED EMBODIMENTS

Reference is now made to FIG. 1, in which there is shown a reservoir 1, provided with a stopper 3, which is able to contain a liquid 5 such as an aqueous solution of urea.

A housing 7 overlapping the interior volume of the reservoir 1 is provided, such that this housing and this reservoir have a shared wall 9.

The reservoir 1 and the housing 7 may both be formed, for example, from high density polyethylene (HDPE).

The housing 7 contains various members which are not shown, such as sensors for sensing the level and temperature of the liquid 5, a sensor for sensing the pressure inside the reservoir 1, a pump, an electrically controlled valve, etc.

A hydraulic connector 11 makes it possible to pump the liquid 5 located inside the reservoir 1 in the direction of the point of use.

The aqueous urea solution 5 is suitable for reducing NOx emissions in the exhaust gases of a diesel engine: in the prior art, reference is made to the SCR process: Selective Catalyst Reduction.

Of course, the present invention is not limited to this type of application, and the method of the invention can be used if the liquid 5 is water in order to cool a gasoline engine to comply with the new anti-pollution standards, according to which it is no longer permitted to cool a gasoline engine by injecting excess fuel for the sole purpose of cooling the engine, or if this liquid is a mixture of water and alcohol (for example ethanol) for a hydrogen-cell-powered engine.

As is known per se, in its lower part, that is to say in its part intended to be located toward the bottom when the assembly of reservoir 1 and housing 7 is in use on board a vehicle, the housing 7 has an outer wall having an orifice provided with a breathable membrane 13.

As is known per se, such a membrane 13 makes it possible for water vapor to circulate into or out of the housing 7, but prevents the passage of liquid water. This membrane equalizes the total and partial pressures of the gases on either side of the wall of the housing.

Reference will now be made more particularly to FIG. 2.

As can be seen in this figure, the housing 7 has, on the inside of its wall 9, heating elements 15, which may be formed for example by self-regulating heating ceramics, often denoted in the literature as "PTC elements".

FIG. 2 shows the reservoir 1 and the housing 7 when the reservoir 1 is being filled with liquid 5.

During this filling operation, the liquid 5 suddenly cools the wall 9, thereby having the effect of suddenly cooling the humid air present inside the housing 7, consequently reducing the saturation vapor pressure, causing the condensation of the excess water vapor and the appearance of moisture in the form of condensate on the inner face of the wall 9.

This condensation is detrimental to all of the members located inside the housing 7, running the risk of causing corrosion phenomena in these members.

To avoid this drawback, the method according to the invention consists in activating the heating elements 15, such that they emit heat (symbolized by the arrows 20) increasing the saturation vapor pressure and evaporating the water droplets 17 appearing on the inside of the wall 9.

Thus, the partial pressure of the water vapor inside the housing 7, and also the overall pressure of the air inside this housing, increase, such that the air passes through the membrane 13 out of the housing 7, as is indicated by the arrow 21.

It is thus possible to quickly reduce the phenomenon of condensation inside the housing 7, and thus protect the members located inside this housing against phenomena of corrosion or electrical insulation fault.

In practice, it was possible to verify that activation of the heating elements 15 for a few minutes was enough to significantly reduce the humidity inside the housing 7.

It is also possible to envisage activating the heating elements 15 periodically, in order to evaporate the residual condensates in an already dry environment and therefore to further reduce the humidity.

More specifically, a temperature increase of 60K makes it possible typically to discharge 20% of the water vapor volume to the outside through the breathable wall 13, and a temperature increase of 80K makes it possible typically to discharge 30% of this water vapor volume.

It will be noted that the heating elements 15 already exist inside the housing 7, that is to say that they are used in any case for an antifreeze (melting) function of the solidified product 5.

Thus, the present invention in no way requires the installation of new heating elements inside the housing 7, but consists in an activation of these elements outside of their previously known operating circumstances.

Thus, the present invention can be implemented without new equipment, and therefore without considerable additional cost, on existing vehicles.

In the above text, the invention has been illustrated in the case in which the rapid cooling of the wall 9 of the housing 7 is caused by the reservoir 1 being filled with the liquid 5.

It will however be noted that the method according to the invention can be implemented in other types of circumstances, for example when the housing 7 is suddenly cooled during fording of the vehicle, this cooling then being caused by the body of water through which the vehicle passes: this is because the reservoir 1 and its associated housing 7 are frequently installed in the floor of the vehicle, that is to say in a zone exposed during fording.

Of course, the invention is described in the above text by way of example. It is understood that those skilled in the art are able to produce different variant embodiments of the invention without thereby departing from the scope of the invention.

The invention claimed is:

1. A method for heating a housing containing at least one functional member including at least one of a temperature sensor, a pressure sensor, and a level sensor, said housing including at least one wall shared with a reservoir configured to receive a liquid, the housing overlapping an interior volume of the reservoir, and at least one wall provided with an orifice leading to the outside and closed by a pressure equalizing membrane porous to water vapor and impermeable to liquid water, the method comprising:

heating humid air inside an interior volume of said housing overlapping the interior volume of the reservoir including the at least one wall shared with the reservoir and the at least one wall provided with the orifice in at least one of the following situations, the heating of the interior volume of the housing being triggered based on information supplied by at least one of the temperature sensor, the pressure sensor, and the level sensor inside the housing:

(i) when the information supplied by the temperature sensor indicates that said reservoir is subjected to a drop in temperature other than a drop in temperature that causes said liquid to freeze, (ii) each time a vehicle equipped with the housing is started, and (iii) when thermal conditions that produce condensates are detected in the interior volume of said housing, closed by said membrane, indicated by the information supplied by one of the temperature sensor and the level sensor.

2. The method as claimed in claim 1, wherein the interior volume of said housing is heated when reservoir is filled with said liquid, or after having detected the reservoir being filled with the liquid.

3. The method as claimed in claim 2, wherein the interior volume of said housing is heated by a plurality of heating elements secured to said shared wall and provided to ensure that said liquid melts.

4. The method as claimed in claim 2, wherein the interior volume of said housing is heated by a heat flow coming from the engine of a vehicle equipped with said reservoir.

5. The method as claimed in claim 2, further comprising sensing an opening of the filling orifice of said reservoir by an opening sensor.

6. The method as claimed in claim 1, wherein the interior volume of said housing is heated when said reservoir and said housing are at least partially submerged during fording.

7. The method as claimed in claim 6, wherein the interior volume of said housing is heated by a plurality of heating elements secured to said shared wall and provided to ensure that said liquid melts.

8. The method as claimed in claim 6, wherein the interior volume of said housing is heated by a heat flow coming from the engine of a vehicle equipped with said reservoir.

9. The method as claimed in claim 1, wherein the interior volume of said housing is heated by a plurality of heating elements secured to said shared wall and provided to ensure that said liquid melts.

10. The method as claimed in claim 1, wherein the interior volume of said housing is heated by a heat flow coming from the engine of a vehicle equipped with said reservoir.

11. The method as claimed in claim 1, further comprising sensing an opening of the filling orifice of said reservoir by an opening sensor.

12. The method as claimed in claim 1, wherein the interior volume of said housing is heated for at least 30 seconds and at most 2 hours, to raise an absolute temperature of the interior volume from 30K to 100K.

13. The method as claimed in claim 1, wherein the reservoir is configured to hold urea to reduce NOx emissions in a diesel engine and the housing is integral with the reservoir configured to hold urea.

14. The method as claimed in claim 1, wherein the reservoir is configured to hold water to cool a gasoline engine and the housing is integral with the reservoir configured to hold water.

15. The method as claimed in claim 1, wherein the reservoir is configured to hold fuel to supply hydrogen production device of a fuel-cell-powered engine.

16. A device for controlling the heating of the interior volume of said housing, wherein the device is programmed to implement the heating method as claimed in claim 1.

17. A non-transitory computer-readable medium on which is stored a computer program, which when executed by a computer in a device for controlling the heating of the interior volume of the housing, causes the computer to perform the method of claim 1.

18. The method as claimed in claim 1, wherein the housing is at least partially contained within the reservoir.

19. The method as claimed in claim 1, wherein the heating the humid air in the interior volume of the housing comprises activating at least one heating element disposed on the at least one wall shared with the reservoir to emit heat into the interior volume of the housing and through the at least one wall shared with the reservoir.

* * * * *